United States Patent
Gong (10) Patent No.: US 10,911,917 B2
(45) Date of Patent: Feb. 2, 2021

(54) CONTENT DELIVERY METHOD AND CONTENT UPDATE METHOD FOR INTERNET OF VEHICLES

(71) Applicant: BOE Technology Group Co., Ltd., Beijing (CN)

(72) Inventor: Weibing Gong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 20 days.

(21) Appl. No.: 16/241,450

(22) Filed: Jan. 7, 2019

(65) Prior Publication Data

US 2019/0327588 A1  Oct. 24, 2019

(30) Foreign Application Priority Data

Apr. 20, 2018  (CN) .......................... 2018 1 0359057

(51) Int. Cl.
  *H04W 4/44*  (2018.01)
  *G06F 16/906*  (2019.01)
  (Continued)

(52) U.S. Cl.
  CPC ............ *H04W 4/44* (2018.02); *G06F 16/906* (2019.01); *G06F 16/9035* (2019.01); *G06F 17/11* (2013.01); *H04L 67/1078* (2013.01)

(58) Field of Classification Search
  CPC .... G06F 16/9035; G06F 16/906; G06F 17/11; H04L 67/1078; H04W 4/44
  See application file for complete search history.

(56) References Cited

U.S. PATENT DOCUMENTS

2015/0146620 A1*  5/2015  Phan ..................... H04W 76/14
                                    370/328
2015/0339923 A1*  11/2015  Konig .................... H04L 67/12
                                    701/522

(Continued)

FOREIGN PATENT DOCUMENTS

CN      105072030 A    11/2015
CN      103475710 B    5/2017
(Continued)

OTHER PUBLICATIONS

Kwon et al.; "Neighbor stability-based VANET clustering for urban vehicular environments", Sep. 2015 (Year: 2015).*

(Continued)

*Primary Examiner* — Jerry B Dennison
(74) *Attorney, Agent, or Firm* — Myers Bigel, P.A.

(57) ABSTRACT

A content delivery method and a content update method for a vehicle network associated with an Internet of Vehicles are disclosed. The content delivery method for an Internet of Vehicles includes dividing the plurality of onboard units into clusters based on interest content information of the plurality of onboard units. Each of the clusters includes at least one cluster-head onboard unit. The method includes receiving, by the cluster-head onboard unit, an interest content access request of an requestor onboard unit in the cluster, searching for the interest content corresponding to the interest content access request in the Internet of Vehicles and sending the searched interest content to the requestor onboard unit.

14 Claims, 5 Drawing Sheets

(51) Int. Cl.
*G06F 16/9035* (2019.01)
*G06F 17/11* (2006.01)
*H04L 29/08* (2006.01)

(56) References Cited

U.S. PATENT DOCUMENTS

| | | | | |
|---|---|---|---|---|
| 2016/0143077 | A1* | 5/2016 | Fodor | H04W 72/082 |
| | | | | 370/329 |
| 2016/0150451 | A1* | 5/2016 | Barreto de Miranda Sargento | H04W 36/32 |
| | | | | 370/332 |
| 2016/0277513 | A1 | 9/2016 | Kim et al. | |
| 2017/0104824 | A1* | 4/2017 | Bajwa | H04W 4/44 |
| 2018/0077676 | A1* | 3/2018 | Kaloxylos | H04W 76/27 |
| 2018/0137593 | A1* | 5/2018 | Djuric | G06Q 50/30 |
| 2018/0341691 | A1* | 11/2018 | Ekbom | G06F 11/1662 |
| 2019/0098673 | A1* | 3/2019 | Goyal | H04L 65/4076 |
| 2019/0102793 | A1* | 4/2019 | Krishnamurthy | G06Q 30/0255 |
| 2019/0141495 | A1* | 5/2019 | Jha | H04W 4/40 |
| 2019/0174276 | A1* | 6/2019 | Mineiro Ramos de Azevedo | H04W 4/38 |
| 2019/0174286 | A1* | 6/2019 | Guo | H04W 4/00 |
| 2019/0261322 | A1* | 8/2019 | Xu | H04W 76/14 |
| 2019/0327588 | A1* | 10/2019 | Gong | G06F 16/9035 |
| 2020/0077443 | A1* | 3/2020 | Xie | H04W 76/27 |

FOREIGN PATENT DOCUMENTS

| | | |
|---|---|---|
| CN | 106714235 A | 5/2017 |
| CN | 107734482 A | 2/2018 |

OTHER PUBLICATIONS

First Office Action and English language translation, CN Application No. 201810359057.9, dated Jun. 3, 2020, 19 pages.
Zhou et al., "Distributed Media Services in P2P-Based Vehicular Networks", IEEE Transactions on Vehicular Technology, vol. 60, No. 2, Feb. 2011, pp. 692-703.

* cited by examiner

CONTENT DELIVERY METHOD AND CONTENT UPDATE METHOD FOR INTERNET OF VEHICLES

CROSS REFERENCE TO RELATED APPLICATIONS

This U.S. non-provisional patent application claims priority under 35 U.S.C. § 119 to Chinese patent application No. 201810359057.9 filed on Apr. 20, 2018, the entire disclosure of which is incorporated herein by reference.

TECHNICAL FIELD

The present disclosure relates to the field of communication technology, and in particular, to a content delivery method and a content update method for Internet of Vehicles.

BACKGROUND

In the current Internet of Vehicles, it is mainly implemented based on a content delivery network (CDN) to realize network content delivery to vehicles. In the content delivery network of the related art, a CDN server is built at the roadside unit (RSU), thereby delivering the network content required by the user to the onboard unit (OBU) of each passing vehicle by the roadside unit. However, due to characters of Internet of Vehicles, e.g. the rapid mobility of the passing vehicle and the instability of the wireless network environment, the onboard unit of the passing vehicle often cannot completely receive the required network content within the communication range of the roadside unit, thereby making the network content delivery inefficient.

SUMMARY

In view of the deficiencies or disadvantages of the related art, the present disclosure provides a solution capable of effectively improving the efficiency of network content delivery in the Internet of Vehicles.

According to a first aspect of the present disclosure, a content delivery method for Internet of Vehicles is provided, the vehicle network comprising a plurality of onboard units and at least one roadside unit, the method comprising:

dividing the plurality of onboard units into clusters based on interest content information of the plurality of onboard units, wherein each of the clusters comprises at least one cluster-head onboard unit;

receiving, by the cluster-head onboard unit, an interest content access request of a requestor onboard unit in the cluster;

searching for the interest content corresponding to the interest content access request in the Internet of Vehicles, and sending the searched interest content to the requestor onboard unit.

According to a second aspect of the present disclosure, a content update method for Internet of Vehicles is provided, the vehicle network comprising a plurality of onboard units and at least one roadside unit, the method comprising:

dividing the plurality of onboard units into clusters based on interest content information of the plurality of onboard units, wherein each of the clusters comprises at least one cluster-head onboard unit;

periodically updating a content copy stored in the onboard unit in the cluster according to a first degree of interest; and periodically updating a content copy stored in a second-level CDN server at the roadside unit in the Internet of Vehicles according to a second degree of interest.

According to a third aspect of the present disclosure, a content delivery device for Internet of Vehicles is provided, comprising:

a clustering means for dividing onboard units into clusters based on interest content information of the onboard units, wherein each of the clusters comprises at least one cluster-head onboard unit;

a receiving means for receiving an interest content access request of a requestor onboard unit in the cluster;

a searching means for searching for an interest content corresponding to the interest content access request in the Internet of Vehicles; and a sending means for sending the searched interest content to the requestor onboard unit.

According to a fourth aspect of the present disclosure, a content update device for Internet of Vehicles is provided, comprising:

a clustering means for dividing onboard units into clusters based on interest content information of the onboard units, wherein each of the clusters comprises at least one cluster-head onboard unit;

a first updating means for periodically updating a content copy stored in the onboard unit in the cluster according to a first degree of interest; and a second updating means for periodically updating a content copy stored in a second-level CDN server at the roadside unit in the Internet of Vehicles according to a second interest degree.

According to a fifth aspect of the present disclosure, there is presented a non-transitory computer readable storage medium storing computer program instructions thereon which, when executed, perform the content delivery method or the content update method for Internet of Vehicles according to some embodiments of the present disclosure.

The content delivery and update method for the Internet of Vehicles provided by the embodiments of the present disclosure can effectively improve the efficiency of network content delivery to the vehicle and reduce the load on the Internet of Vehicles by combining the clustering of onboard units according to interest and the peer-to-peer network (P2P) between the members in the cluster on the basis of the CDN.

BRIEF DESCRIPTION OF THE DRAWINGS

Other features, objects, and advantages of the present application will become more apparent from the following detailed description of non-limiting embodiments with reference to the accompanying drawings.

DETAILED DESCRIPTION

The present application will be further described in detail below with reference to the accompanying drawings and embodiments. It is understood that the specific embodiments described herein are merely illustrative of the invention, rather than limitation to the invention. It should also be noted that, for the convenience of description, only parts related to the invention are shown in the drawings.

It should be noted that the embodiments in the present application and the features in the embodiments may be combined with each other in the case of no conflict. The present application will be described in detail below with reference to the accompanying drawings.

Figure 1:
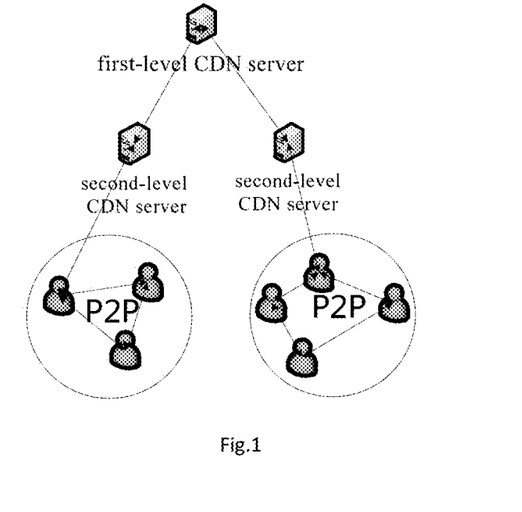
FIG. 1 schematically illustrates a content delivery architecture for Internet of Vehicles according to some embodiments of the present disclosure.

FIG. 1 schematically illustrates a content delivery architecture for Internet of Vehicles according to some embodiments of the present disclosure. In some embodiments according to the present disclosure, in view of the self-organizing characteristics of the vehicle OBUs in the Internet of Vehicles and the possibility of parallel transmission between the vehicles traveling in a same direction, a content delivery architecture as shown in FIG. 1 can be employed in the Internet of Vehicles. It can be divided into three layers: the first layer is the first-level CDN server provided by the content provider of the website, which is located at the highest level of the network; the second layer is composed of the second-level CDN servers built on the roadside units, and these second-level CDN servers receive the content from the upper first-level CDN servers and provide services for lower OBU nodes; the third layer is a cluster composed of vehicle OBUs, and each cluster is composed of a plurality of vehicle OBUs in a P2P mode. The content delivery architecture described above is a fusion of a CDN structure and a P2P structure, and is therefore also referred to as a CDN-P2P-based content delivery architecture.

Figure 2:
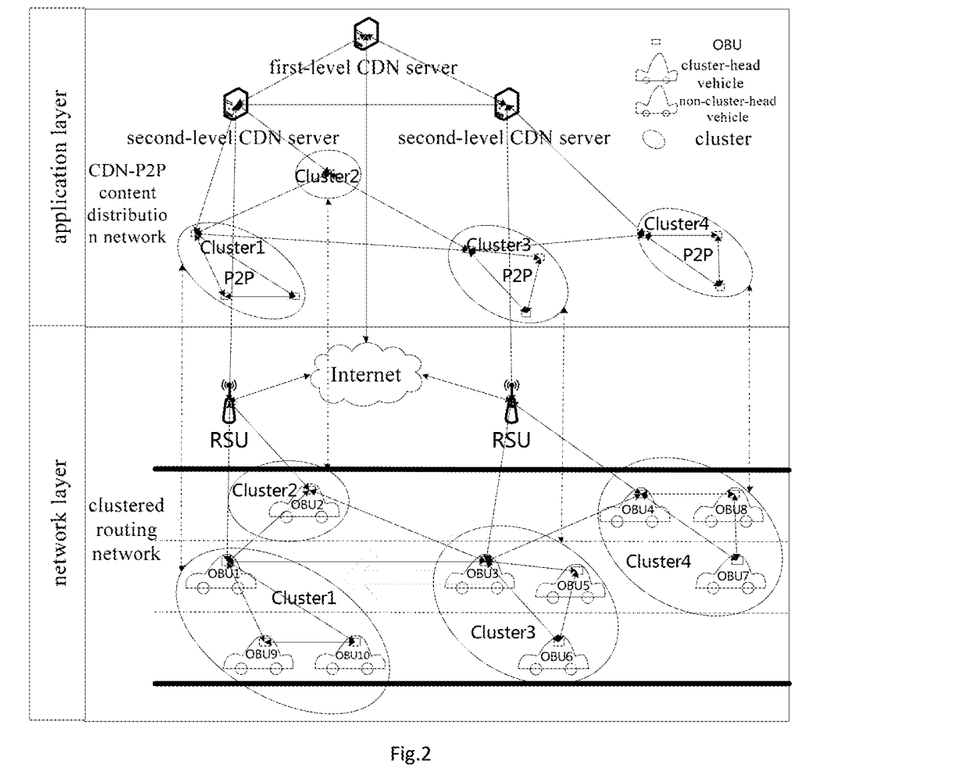
FIG. 2 schematically illustrates a cross-layer topology of a content delivery method according to some embodiments of the present disclosure.

FIG. 2 schematically illustrates a cross-layer topology of a content delivery method according to some embodiments of the present disclosure. More specifically, FIG. 2 provides a cross-layer topology diagram of a CDN-P2P-based content delivery architecture according to some embodiments of the present disclosure. As shown in FIG. 2, the CDN-P2P-based content delivery architecture comprises a CDN-P2P content delivery network and a clustered routing network constructed at the application layer (above) and the network layer (below) respectively. The two networks located at different layers can communicate directly with each other, wherein the clustered routing network sends the clustering information to the content delivery network, and the content delivery network transmits the OBU interest content information to the clustered routing network. The two networks coordinate with each other to form a CDN-P2P-based content delivery architecture for improving the efficiency of content delivery in the Internet of Vehicles.

As shown in FIG. 2, the CDN-P2P-based content delivery architecture comprises four clusters Cluster1-Cluster4 composed of vehicle OBUs (where Cluster1 comprises OBU1, OBU9, and OBU10, Cluster2 comprises OBU2, Cluster3 comprises OBU3, OBU5, and OBU6, and Cluster4 comprises OBU4, OBU7, and OBU8), and two roadside units RSU1-2. Each of the RSU1-2 has a second-level CDN server. These RSUs make the second-level CDN server built thereon communicate with the first-level CDN server on the Internet by connecting to the Internet backbone network. The clusters Cluster1-Cluster4 as shown in FIG. 2 are actually groups formed by the onboard units OBU1-OBU9 in the vehicles traveling in the same direction in the Internet of Vehicles according to certain conditions (e.g., according to the interest content of each onboard unit). All members in a cluster (group) are interconnected to form a peer-to-peer network (P2P), and thus each cluster can also be referred to as a P2P cluster. As shown in FIG. 2, each cluster Cluster1-Cluster4 comprises at least one cluster-head OBU1-OBU4, that is, the cluster-heads of Custer1-4 are OBU1-4 respectively. The cluster-heads OBU1-OBU4 can be used to form a wireless ad hoc network with other clusters, and are used to connect to the Internet, and play a key role in updating the interest content of all the onboard units OBU1-OBU9 from the Internet.

Figure 3:
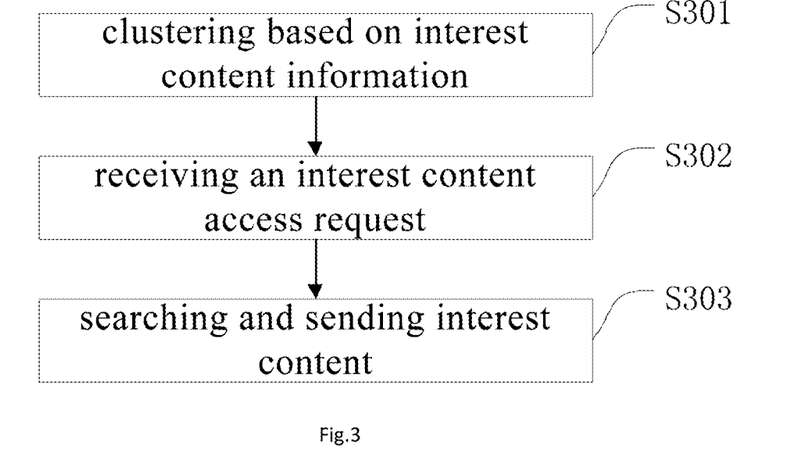
FIG. 3 illustrates a flowchart of a content delivery method for Internet of Vehicles according to some embodiments of the present disclosure.

For a further detailed explanation of the topology in FIG. 2, please refer to the corresponding description of the content delivery method shown in FIG. 3.

FIG. 3 illustrates a flowchart of a content delivery method for Internet of Vehicles according to some embodiments of the present disclosure. The content delivery method for Internet of Vehicles according to some embodiments of the present disclosure may be performed based on the CDN-P2P-based content delivery architecture illustrated in FIG. 2. As shown in FIG. 2, the Internet of Vehicles comprises a plurality of onboard units OBU1-OBU10 and at least one roadside unit RSU1-RSU2. As shown in FIG. 3, the content delivery method comprises steps S301-S303, and the steps are specifically described below.

S301, a clustering step of the onboard units: dividing the onboard units into clusters based on the interest content information of the plurality of onboard units, wherein each of the clusters comprises at least one cluster-head onboard unit.

In the content delivery method according to some embodiments of the present disclosure, clustering of the onboard units (i.e., step S301) is a prerequisite for realizing content delivery. Taking FIG. 2 as an example, each of the onboard units OBU1-9 in the Internet of Vehicles can send its own interest content information to other surrounding onboard units OBU1-9, for example, through the HELLO packet of the wireless ad hoc network. When the interest content information of one or more receiver onboard units which receive interest content information sent by the sender onboard units is the same as or similar to the received interest content information, that is, when the interest content of the sender is consistent with that of the one or more receiver, the sender and receiver onboard units can be divided into one cluster.

In some embodiments according to the present disclosure, after clustering based on the consistency of the interest content, at least one onboard unit in a cluster may be selected as a cluster-head based on status information of each member or onboard unit in the cluster. The status information of the onboard unit may comprise data forwarding capabilities, data processing capabilities, communicating capabilities with members of the cluster, signal strength received from adjacent roadside units, vehicle speed and location, and the like.

For example, according to the clustering method as described above, the onboard units OBU1-9 in FIG. 2 are divided into four clusters Cluster1-4, wherein OBU1-4 are cluster-heads of these clusters, respectively. It is noted that Cluster 2 contains only one onboard unit OBU2. This is because OBU2 may not find any onboard unit that is consistent with its interest content. Therefore, as a special case, this special onboard unit OBU2 can be directly divided into one cluster.

In general, the onboard unit clustering strategies according to some embodiments of the present disclosure may be used for onboard units in vehicles that are traveling in the same direction and that are consistent or close in vehicle speed.

The cluster-head is a cluster member (onboard unit) with management functions, and its functions mainly comprise: collecting and forwarding interest content information of members in the cluster; and storing the network hot spot content received from the Internet content provider through the roadside unit on the disks of members in the cluster according to storage remaining condition of members in the cluster; obtaining the interest content of the members in the cluster from the Internet content provider and forwarding it to the corresponding onboard unit; managing the adding or removing of members in the cluster (for example, the joining of new member and deleting of existing members) and so on. As described above, each member of the cluster can exchange information (e.g. disk storage status, interest content, location, and vehicle speed, etc.) through the HELLO packet of the P2P ad hoc network. Therefore, the cluster-head can implement its various management functions by means of the HELLO packet.

S302, a receiving step of interest content access request: receiving, by the cluster-head onboard unit, an interest content access request of a requestor onboard unit in the cluster.

In some embodiments according to the present disclosure, any one of the members (i.e., the onboard units) in the cluster may send an interest content access request to the cluster-head through the P2P wireless network in the cluster to obtain the interest content.

S303, a step of searching and sending the interest content: searching for the interest content corresponding to the interest content access request in the Internet of Vehicles, and sending the searched interest content to the requestor onboard unit.

In some embodiments according to the present disclosure, when the cluster-head receives the interest content access request sent by the member in the cluster, the interest content may be searched in nodes (for example, the onboard unit, the second-level CDN server of the roadside unit, and the first-level CDN server of the content provider) in the Internet of Vehicles from the lower layer to the upper layer. Optionally, the search order of nodes in the Internet of Vehicles is: a cluster-head onboard unit, a non-cluster-head onboard unit, a second-level CDN server on the road side unit, and a first level CDN server provided by the content provider. Such a search order can effectively reduce the network load.

In some embodiments according to the present disclosure, when the interest content is searched in the cluster-head onboard unit in the cluster, the interest content is sent by the cluster-head to the sender; when the interest content is searched in the non-cluster-head onboard unit in the cluster, the interest content is sent by the non-cluster-head onboard unit to the requestor onboard unit; when the interest content is searched in the second-level CDN server, the interest content is sent by the second-level CDN server to the requestor onboard unit through the cluster-head of the cluster where the requestor onboard unit is located; when the interest content is searched in the first-level CDN server, the interest content is sent by the first-level CDN server to the roadside unit corresponding to the requestor onboard unit, and then the interest content is sent by the roadside unit to the requestor onboard unit through the cluster-head onboard unit of the cluster where the requestor onboard unit is located.

The content delivery method for Internet of Vehicles provided by the embodiments of the present disclosure can effectively improve the efficiency of network content delivery to the vehicle and reduce the load on the Internet of Vehicles by combining the clustering of onboard units according to interest and the peer-to-peer network (P2P) between the members in the cluster on the basis of the CDN.

Figure 4:
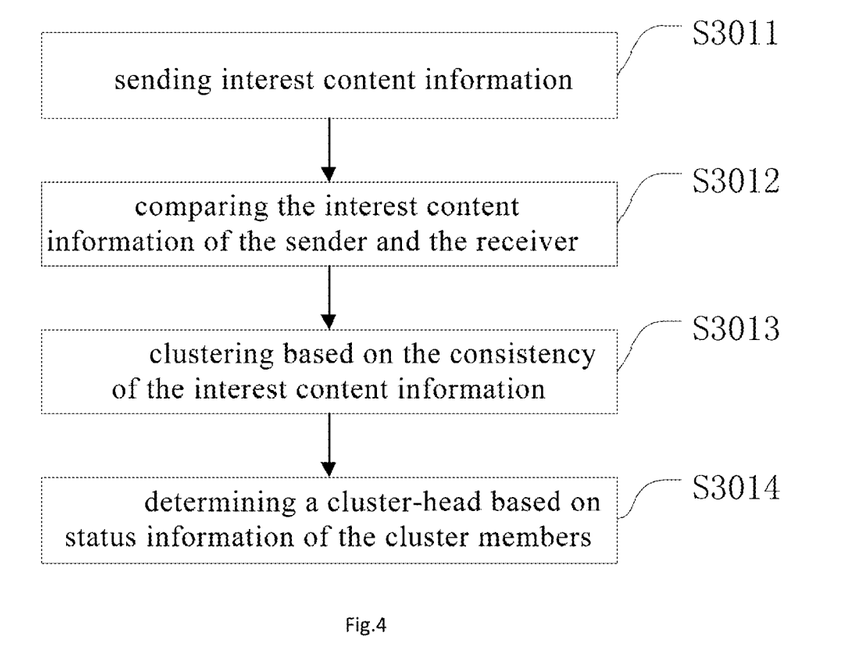
FIG. 4 illustrates a flowchart of the step of clustering onboard units in a content delivery method according to some embodiments of the present disclosure.

FIG. 4 illustrates a flowchart of the step of clustering onboard units in a content delivery method for Internet of Vehicles according to some embodiments of the present disclosure. As shown in FIG. 4, the onboard unit clustering step S301 shown in FIG. 2 may comprise steps S3011-3014.

S3011, sending, by an sender onboard unit in the Internet of Vehicles, an interest content information of the sender onboard unit to an receiver onboard unit adjacent to the sender onboard unit. For example, each onboard unit can add its interest content, comprising summary information such as content name and address etc., to the HELLO packet in real time, and then send it to its surrounding onboard units. For the purpose of explanation, herein the onboard unit that receives the interest content information can be referred to as a receiver onboard or receiver, and the onboard unit that sends the interest content information can be referred to as a sender onboard unit or sender.

S3012, comparing, by the receiver onboard unit, the interest content information of the sender onboard unit with an interest content information of the receiver onboard unit.

S3013, in case of the interest content information of the receiver onboard unit and the interest content information of the sender being consistent, dividing the sender onboard unit and the receiver onboard unit into one cluster. If one or more onboard units that receive the interest content information find it has a content interest that is consistent with them, the receiver and the sender may form a cluster. From this moment on, if the nodes in the cluster want to send the HELLO packet again, the clustered information will be added to the HELLO packet.

S3014, determining a cluster-head onboard unit based on status information of each onboard unit in the cluster.

In some embodiments according to the present disclosure, after clustering based on the consistency of the interest content, at least one onboard unit may be selected as a cluster-head based on status information of each member or onboard unit in the cluster. The status information of the onboard unit may comprise data forwarding capabilities, data processing capabilities, communicating capabilities with members of the cluster, signal strength received from adjacent roadside units, vehicle speed and location, and the like.

After the onboard unit is clustered based on the interest content, there may still be onboard units with content interest consistent with or similar to that of the cluster member within its communication range or there may be new onboard units with content interest consistent with that of the cluster member entering its communication range. Therefore, if such an onboard unit wants to join the cluster, it can send an application message to join the cluster to an adjacent cluster member in the cluster, and the application message to join the cluster may comprise the applicant's interest content information, the vehicle speed, the distance from the cluster, etc. The cluster member receiving the message can forward it to the cluster-head, and then the cluster-head determines whether the applicant is suitable to join the cluster based on the application message (i.e., the applicant's speed, content interest, distance from the cluster, etc.). If the applicant is suitable to join the cluster, return a confirmation message to the applicant, otherwise send a rejection message.

In some embodiments according to the present disclosure, all members in a cluster may periodically send their vehicle speed, location, and interest changes to the cluster-head so that the cluster-head can determine in real time whether the member is suitable to remain in the cluster. For example, if the speed of a member in the cluster changes and the member has travel out of the specified range of the cluster, the HELLO packet can be used to determine whether it is within the direct communication range of all members of the cluster. If not, the member can be directly deleted by the cluster-head when the HELLO packet times out; if it is within the direct communication range, the cluster-head judges whether to delete the member based on the positioning information sent in real time. Similarly, if the speed or content interest of a cluster member changes, the member can be deleted accordingly.

The cluster-head is not fixed and can be updated in real time based on changes of the network environment. Cluster-head updates can be based on both subjective and objective factors. Subjective factors may be that a cluster-head wants to leave the cluster, and objective factors may comprise changes in its status information that make it not suitable to be a cluster-head, such as the signal strength received from the roadside unit becoming weaker, the vehicle speed becoming inconsistent with the member in the cluster, etc.

For the subjective factor, when the cluster-head wants to leave the cluster, it first selects one of its neighbor nodes as a temporary cluster-head; then the temporary cluster-head notifies the cluster member to change the cluster-head; all members in the cluster send their status information to the temporary cluster-head; the temporary cluster-head determines the new cluster-head based on the status information and notifies all members in the cluster. In this way, the new cluster-head begins to perform cluster-head duties, including collecting and managing interest content, joining and deleting members, forwarding member data, etc.

For the objective factor, if the cluster-head is not suitable to be a cluster-head because of objective factors, such as inconsistent vehicle speed, weak signal strength received from the roadside unit, etc., but the content interest of the cluster-head remains unchanged and request to stay in the cluster, then it can select a new cluster-head based on the status information of all members in the cluster, and then send the management information (e.g., a member list, a content list, etc.) to the new cluster-head, and notify all members in the cluster.

In some embodiments of the present disclosure, the strategy of determining cluster-heads based on status information as illustrated the step S3014 in FIG. 4 may be performed based on, for example, an ant colony algorithm. The principle of the ant colony algorithm is described below. Ants will leave pheromones along the way when searching for food, and the number of ants passing through the optimal path in unit time will be larger than that of other paths, therefore the pheromone concentration in the optimal path become maximal over time. Thus, the optimal path from the ant nest to the food source can be obtained based on pheromone concentration.

In order to select the cluster-head, it is necessary to determine the status information of each onboard unit in the cluster. The ant colony algorithm can be used to represent the status information as the pheromone concentration, and then the optimal cluster-head can be selected by calculating the pheromone concentration of each cluster member.

Next, the cluster-head determination approach based on ant colony algorithm is introduced in detail. Assuming that a cluster in the Internet of Vehicles contains n (n>=2) onboard units, based on the ant colony algorithm, the following equation (1) is used to determine the status information of the onboard unit OBU i (i=1, . . . , n) in the cluster:

$$\sigma_i = \frac{Pc_i Tc_i Sc_i SS_{v_i r}}{IC_i(\alpha + (S_i - S_{avg})^2)} \quad (1)$$

wherein $\sigma_i$ represents status information of the OBU i;

$Pc_i$ represents a calculation processing capability value of the OBU i;

$Tc_i$ represents a data forwarding capability value of the OBU i;

$Sc_i$ represents a size of remaining disk storage space of the OBU i;

$SS_{v_i r}$ represents a signal strength received from the nearest roadside unit by the OBU i;

$S_i$ represents a vehicle speed of the OBU i, $S_{avg}$ represents an average vehicle speed of all OBU in the cluster, and $\alpha + (S_i - S_{avg})^2$ represents a proximity of the vehicle speed of the OBU i to the average vehicle speed of all OBU in the cluster, wherein $\alpha$ is a constant representing a predetermined adjustment parameter;

$IC_i$ represents a similarity between the interest content information of the OBU i and the interest content information of other OBUs in the cluster.

It can be seen from equation (1) that, first, because the cluster-head onboard unit has the functions of data forwarding and storage and management of interest content in the cluster, for OBU i as a candidate for cluster-head, the stronger its computing power is, the stronger its data forwarding capability is, and the larger its remaining disk storage space is, the higher the content delivery efficiency of the OBU i as a candidate for cluster-head onboard unit will be, which is more suitable as a cluster-head; second, the stronger the signal strength from the roadside unit received by the OBU i is, the more suitable it is for the OBU i to be the cluster-head; third, the closer the vehicle speed of the vehicle where the OBU i is located is to the average speed of all vehicle in this cluster, the more suitable it is for the OBU i to be the cluster-head onboard unit.

In some embodiments according to the present disclosure, $IC_i$ may be determined by calculating the Euclidean distance according to the following equation (2):

$$IC_i = D((C_{i1}, C_{i2}, \ldots C_{in}), E(C_{j1}, C_{j2}, \ldots C_{jn})), \quad (2)$$

wherein $(C_{i1}, C_{i2}, \ldots C_{in})$ represents a content vector of the interest content information of the OBU i, E $(C_{j1}, C_{j2}, \ldots C_{jn})$ represents an expectation vector of the interest content information of other onboard units in the cluster where the OBU i is located.

In some embodiments according to the present disclosure, a cluster-head selection probability of the onboard unit may also be defined based on its status information or pheromone concentration. For example, the cluster-head selection probability for each onboard unit can be defined as:

a. $$P_i = \frac{\sigma_i^k}{\sum_i (\sigma_i^k)} \quad (3)$$

wherein $P_i$ represents a probability that the OBU i is selected as the cluster-head, and k is a constant representing a predetermined adjustment parameter for adjusting the probability value.

Similarly, the cluster-head can also be determined based on the cluster-head selection probability of equation (3). For example, the onboard unit with the highest probability can be determined as a cluster-head.

Figure 5:
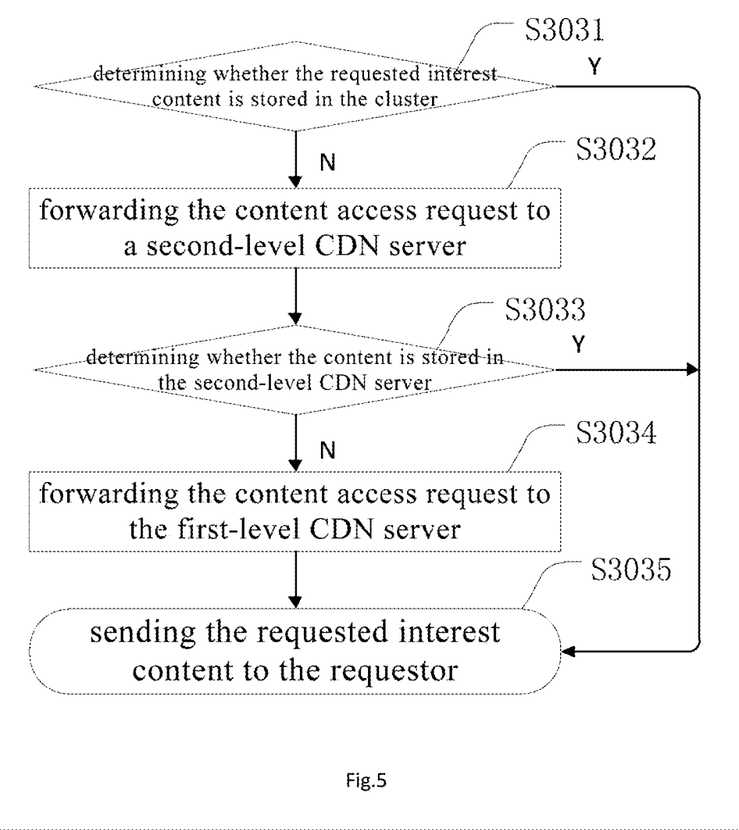
FIG. 5 illustrates a flowchart of the step of searching and sending interest content in a content delivery method according to some embodiments of the present disclosure.

FIG. 5 illustrates a flowchart of steps of searching and sending interest content in a content delivery method according to some embodiments of the present disclosure. As shown in FIG. 5, step S303 of searching and sending the interest content shown in FIG. 3 may comprise the following steps S3031-3035.

S3031, determining whether the requested interest content is stored in the cluster:

if so, proceeding directly to step S3035, i.e., directly sending the interest content to the requestor, and ending the content delivery;

b. if no, going to step S3032.

For example, after receiving the interest content request, the cluster-head may first check whether the requested interest content is included in the content list stored by itself:

if the content list includes the requested interest content, further determining whether the interest content is stored in its own hard disk storage space or other non-cluster-head onboard units, and if stored in the cluster-head, the interest content is directly sent through the intra-cluster P2P wireless network to the requestor, if stored in the non-cluster-head onboard unit, the onboard unit storing the interest content is notified to send the interest content to the requestor, and the content delivery ends; if the requested interest content is not included in the content list, go to next step S3032.

S3032, forwarding, by the cluster-head onboard unit, the interest content access request to the second-level CDN server of the corresponding roadside unit through the content forwarding network, and then proceeding to step S3033.

S3033, determining whether the requested interest content is stored in the second-level CDN server corresponding to the cluster, and if yes, proceeding to S3035, i.e. send the requested interest content to the requestor; otherwise, proceeding to step S3034 to forward the interest content access request to the first-level CDN server.

For example, the second-level CDN server may query whether its own content list comprises the requested interest content, and if the content list of the second-level CDN server comprises the requested interest content, the requested interest content is sent through the clustered routing network of the network layer to the cluster-head in the cluster where the requestor onboard unit is located, and then the requested interest content is forwarded to the requestor by the cluster-head, and the content delivery ends; if the content list of the second-level CDN server does not include the requested interest content, going to next step S3034.

S3034, forwarding, by the second-level CDN server, the request to the first-level CDN server, that is, the content source server. The second-level CDN server can select the most suitable content source server for forwarding based on the distance, bandwidth, and content matching degree. For example, the nearest source server, the source server with the widest connected bandwidth, or the source server with the most matching content may be selected. Then, the process proceeds to step S3035, in which the first-level CDN server sends the requested interest content to the requestor onboard unit.

S3035, sending the requested interest content to the requestor onboard unit, and ending the progress of content delivery. For three different situations in which the interest content is stored in the cluster, the second-level CDN server of the roadside unit, and the first-level CND server or the content source server, the step S3035 of sending the interest content may be performed in different manners. For example, first, in the case where the interest content is stored in the cluster, as described above, the content can be directly sent to the requestor onboard unit through the P2P network within the cluster; second, in the case where the interest content is stored in the second-level CDN server of the corresponding roadside unit, the requested interest content may be sent to the cluster-head of the cluster where the requester onboard unit is located through the cluster routing network, and then the requested interest content is forwarded to the requestor by the cluster-head; third, in the case where the interest content is only stored in the first-level CDN server, the interest content can be sent to the roadside unit corresponding to the requester via the Internet, and then the roadside unit forwards it to the cluster-head of the cluster where the requester is located through the clustering routing network, and finally the cluster-head sends the requested interest content to the requestor onboard unit through the P2P wireless network within the cluster, and the content delivery ends.

In the Internet of Vehicles, in addition to the content delivery method, content consistency is also required. The so-called content consistency refers to a real-time update behavior of the content copy stored in the CDN content server (including the first-level CDN server and the second-level CDN server) and the cluster for popularity. Here, the popularity refers to the number of visits to this content copy within a certain period of time by the onboard unit.

Figure 6:
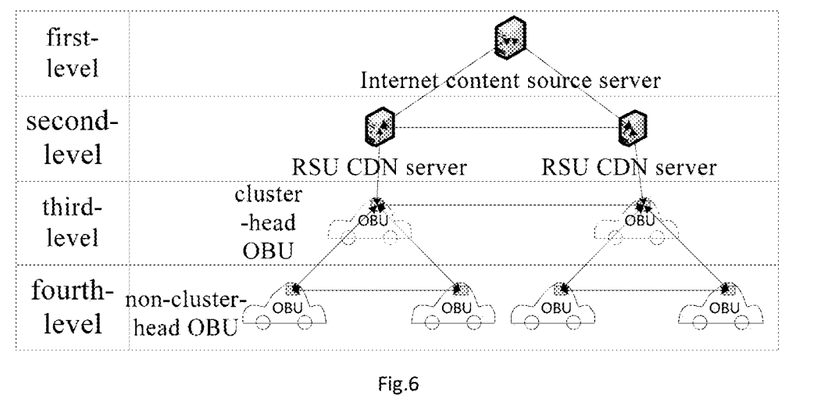
FIG. 6 illustrates a schematic diagram of a content update hierarchical architecture for Internet of Vehicles according to some embodiments of the present disclosure.

FIG. 6 illustrates a schematic diagram of a content update hierarchical architecture for Internet of Vehicles according to some embodiments of the present disclosure. In general, the content copies stored in the content servers (including Internet content source servers and roadside unit CDN servers) and each cluster must be continuously updated to more efficiently meet the real-time requirements of the onboard unit in the cluster for content. FIG. 6 shows a four-level update architecture. According to the passive demand and the active demand, the source of the content copy update is divided into two types: the network hot spot originated from the first-level top layer content source server (the Internet) and the interest content originated from the fourth-level bottom layer onboard unit.

For the network hot spot, each cluster-head can periodically update the content by connecting the wireless ad hoc network between the cluster-heads to the second-level CDN server connected to the roadside unit. The second-level CDN server can periodically collect network hot spot content from various content source servers and stores them on the local disk to update the local outdated hot spot content copy. In this way, it is possible to store some current hot spot network contents in each P2P cluster in real time, which can reduce the network overhead of the Internet of Vehicles to some extent.

For the onboard unit's own interest content, the cluster-head will periodically check the freshness of the interest content of the members in the cluster by accessing the content list in the cluster, and update the copy of the interest content in the cluster in real time. For some copies with few recent visits, the cluster-head will automatically delete them. Then, based on the remaining storage space, the cluster-head applies the CDN server (i.e., the second-level CDN server on the roadside unit) of the upper level through the content delivery network to access the frequently accessed content in the cluster or the current network hot spot content.

Figure 7:
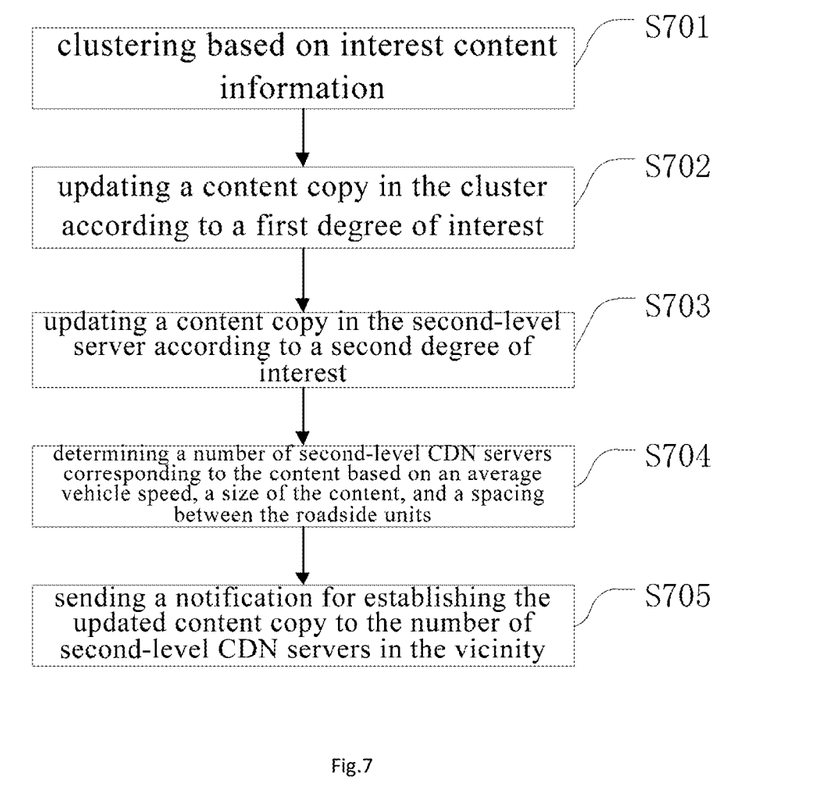
FIG. 7 illustrates a flowchart of a content update method for Internet of Vehicles according to some embodiments of the present disclosure.

FIG. 7 illustrates a flowchart of a content update method for Internet of Vehicles according to some embodiments of the present disclosure, to achieve content consistency in a Internet of Vehicles. As shown in FIG. 7, the content update method for Internet of Vehicles comprises the following steps:

S701, dividing the onboard unit into clusters based on the interest content information of each onboard unit, wherein each cluster comprises at least one cluster-head onboard unit. The implementation of this step is the same as that of the onboard unit clustering step S301 in the content delivery method shown in FIG. 3, and details are not described herein again.

S702, periodically updating the content copy stored in the onboard unit in the cluster according to a first degree of interest.

In some embodiments according to the present disclosure, the onboard units, including the cluster-head, in the cluster can create a content list, such as the left table of Table 1, which lists the content copy stored therein, comprising the content name and the content source address and content copy. In fact, this table is not managed by itself, but is managed and maintained by the cluster-head. The cluster-head can establish and maintain a cluster-head copy management list, as shown in the right table of Table 1, which lists the information of all the content copies stored in the cluster where the cluster-head is located, such as the name, storage location, total number of visits, number of recent visits, the length of void time, the degree of interest of the members in the cluster, etc., wherein the number of recent visits represents the number of times the copy was accessed in the most recent period of time, and the length of void time represents the length of time that the copy is not accessed by the onboard unit in the cluster. The degree of interest is determined by the total number of visits, the number of recent visits, and the length of void time, etc. By means of the content copy management list, the cluster-head achieves management of all contents in the cluster, including storage location selection, update, access and transmission of the content.

TABLE 1 content list of the onboard unit in the cluster and cluster-head content management list

| contest list | | | cluster-head copy management list | | | | | |
|---|---|---|---|---|---|---|---|---|
| content name | content source address | content | content name | storage location | total number of visits | number of recent visits | length of unvisited time | degree of interest |
| content 1 | www.1.com | 1 | content 1 | OBU 1 | N(Total) 1 | N(Rect) 1 | T(Void) 1 | IM 1 |
| content 2 | www.2.com | 2 | content 2 | OBU 2 | N(Total) 2 | N(Rect) 2 | T(Void) 2 | IM 2 |
| ... | ... | ... | ... | ... | ... | ... | ... | ... |
| content n | www.n.com | n | content n | OBU n | N(Total) n | N(Rect) n | T(Void) n | IM n |

In some embodiments according to the present disclosure, in order to maintain the freshness of the content copies in the cluster and make all the onboard units in the cluster obtain the network hot spot content and its own special interest content in real time, the content copy may be updated in real time based on the degree of interest for each content copy, and the content copy with lower degree of interest is replaced by the latest hot spot content. The content copy can be obtained by connecting the second-level CDN server of the roadside unit with the source content server on the Internet through the content delivery network.

For clarity of description, the degree of interest of the copy within cluster can be defined as the first degree of interest. In some embodiments according to the present disclosure, the degree of interest of the content copy stored in the cluster, i.e., the first degree of interest, is determined by the following equation:

$$IM_x = \alpha_1 \frac{SS_{v_x r}}{\sigma + (S - S_{avg})^2} + \alpha_2 \frac{N_R^k N_T}{(\tau - T_{void})^k} \quad (4)$$

wherein $IM_x$ represents a first degree of interest of the content copy x, $SS_{v_x r}$ represents a signal strength of the adjacent roadside unit received by the onboard unit where the content copy x is located, S represents a vehicle speed of the onboard unit where the content copy x is located, $S_{avg}$ represents an average vehicle speed of all onboard unit in the cluster including the onboard unit where the content copy x is located, $N_T$ represents a total number of times the content copy x is accessed from the time when it was created to current time, $N_R$ represents a number of times the content copy x is accessed within the preset time period, $T_{void}$ represents a number of times that the content copy x is not accessed within the preset time period, and $\alpha_1$, $\alpha_2$, $\sigma$, $\tau$, and k are value adjustment parameters, all of which are positive constants and $\alpha_1 < \alpha_2$.

It can be seen from the above equation (5) that the stronger the signal received by the onboard unit from the roadside unit is, the less the transmission time of the content copy update on the onboard unit is, and the higher the copy update efficiency is, thus the more preferred the copy on this onboard unit will be updated; the closer the vehicle speed is to the average of the speeds of all vehicles in this cluster, the longer the life of the content copy on the onboard unit is, and the more preferred the copy on this onboard unit will be updated; the more the total number of visits is, the higher the degree of interest of the copy is; the more the number of recent visits is, the higher the degree of interest is; the longer the recent void time is, the lower the degree of interest is.

The degree of interest of the content copy within the cluster determines the probability that it is updated. As shown in the equation (5), the degree of interest of the content copy within the cluster is determined by two factors, i.e., the state of the onboard unit in which the content copy is located and the state of being accessed. The more times the copy is accessed and the shorter the void time, the higher the degree of interest; in addition, the stronger the signal strength is and the closer the vehicle speed is to the average speed, the higher the degree of interest.

Optionally, as shown in FIG. 7, the content update method according to some embodiments of the present disclosure may further comprise step S703: periodically updating the content copy stored in the second-level CDN server of the roadside unit of the Internet of Vehicles according to a second degree of interest.

In some embodiments according to the present disclosure, the updating of the content copy on the second-level CDN server of the roadside unit can also be implemented by calculating the degree of interest of the content copy, and the content copy with lower degree of interest will be replaced by the most recent hot spot content or the content with high download frequency. In order to distinguish from the copy within the cluster, the degree of interest of the content copy on the second-level CDN server may be defined as a second degree of interest.

Specifically, the second degree of interest of the content copy stored in the second-level CDN server of the roadside unit can be calculated according to the following equation (5):

$$IM'_x = \frac{N_R^k N_T}{(\tau - T_{void})^k} \quad (5)$$

wherein $IM'_x$ represents a second degree of interest of the content copy x, $N_T$ represents a total number of times the content copy x is accessed from the time when it was created to current time; $N_R$ represents a number of times the content copy x is accessed within the preset time period; $T_{void}$ represents a number of times that the content copy x is not accessed within the preset time period, $\tau$ is a positive constant for adjusting value.

It can be known from equation (5) that, unlike the first degree of interest of the content copy in the cluster, the second degree of interest of the content copy in the second-level CDN server is only related to the accessed condition thereof, and is independent of the vehicle status information, because the second-level CDN server is located in a fixed roadside unit rather than a mobile onboard unit.

Alternatively, as shown in FIG. 7, the content update method according to some embodiments of the present disclosure may further comprise steps S704-S705.

S704, determining the number of second-level CDN servers corresponding to the updated content copy based on the average vehicle speed on the road where the roadside unit is located, the size of the updated content copy, and the spacing between the roadside units.

The second-level CDN server built on the roadside unit not only needs to update the content copy on it in real time, but also needs to consider the content update on the second-level CDN servers around it. Because the vehicle on the road is moving, in order to access the Internet, it will continuously connect the roadside unit and disconnect the roadside unit. Thus, if a vehicle travels out of the communication range of a corresponding roadside unit while downloading content from a second-level CDN server at the roadside unit, it can only be reconnected to the first-level CDN server on the Internet to download its content. In view of this special case, the second-level CDN server needs to consider the number of second-level CDN servers that need to store this content copy based on the download time of the content copy and the speed of the vehicle.

If a vehicle needs to quickly obtain a content copy from the second-level CDN server, which may not be completed within a time of passing through a roadside unit, the vehicle can continue to download from the second-level CDN server on the next roadside unit side. The number of second-level CDN servers storing the content copy can be determined based on the average speed of the vehicles on the road and the average download duration, and the number at least guarantees that the download of the content can be completed. If the download can't be completed, the vehicle can continue to download by accessing the first-level CDN server on the Internet, and the download can also be completed by notifying the vehicle to reduce the speed without violating the traffic rules.

In some embodiments according to the present disclosure, the number of second-level CDN servers or roadside units corresponding to the updated content copy may be determined according to equation (6);

$$N_y = \frac{Size S_{avg}}{BW_{min} W_{RSU}} + 1 \quad (6)$$

wherein $N_y$ represents a number of roadside units corresponding to the updated content copy y, Size represents a size of the updated content copy y, $S_{avg}$ represents an average speed of vehicles on the road where the roadside unit is located, $BW_{min}$ represents a minimum bandwidth of the Internet of Vehicles, $W_{RSU}$ represents a spacing between the roadside units.

S705: sending a notification for establishing the updated content copy to the number of second-level CDN servers in the vicinity of the second-level CDN server where the updated content copy is located.

Based on the equation (6), when downloading the hot spot content or updating the interest content, the current second-level CDN server notifies the nearby second-level CDN content servers to update the hot spot content or interest content. Accordingly, starting from the current second-level CDN content server, the vehicles with a speed not higher than the average vehicle speed in the front and back directions can successfully obtain the updated content quickly.

It should be noted that although the operations of the method of the present disclosure are described in a particular order in the drawings, this is not required or implied that such operations must be performed in that particular order, or that all illustrated operations must be performed to achieve the desired results. Instead, the order of steps depicted in the flowcharts can change. Additionally or alternatively, certain steps may be omitted, multiple steps may be combined into one step, and/or one step may be decomposed into multiple steps.

Figure 8:
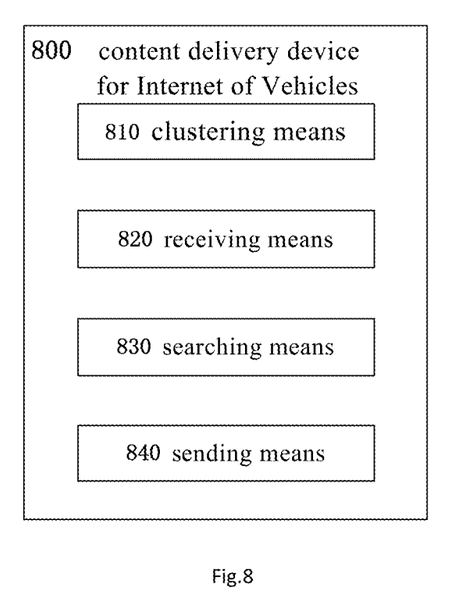
FIG. 8 illustrates a structural block diagram of a content delivery device for Internet of Vehicles according to some embodiments of the present disclosure.

FIG. 8 illustrates a block diagram of a content delivery device for Internet of Vehicles according to some embodiments of the present disclosure. For example, a content delivery method for an Internet of Vehicles according to some embodiments of the present invention may be completed by a content delivery device for the Internet of Vehicles similar to that shown in FIG. 8. As shown in FIG. 8, the content delivery device 800 for the Internet of Vehicles comprises:

a clustering means 810, for dividing onboard units into clusters based on interest content information of the onboard units, wherein each of the clusters comprises at least one cluster-head onboard unit;

a receiving means 820, for receiving an interest content access request of a requestor onboard unit in the cluster;

a searching means 830, for searching for an interest content corresponding to the interest content access request in the Internet of Vehicles; and a sending means 840, for sending the searched interest content to the requestor onboard unit.

Figure 9:
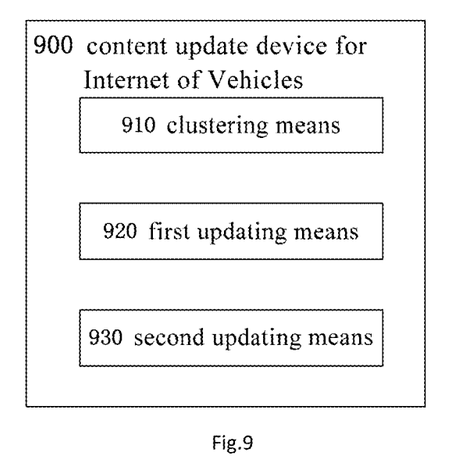
FIG. 9 illustrates a structural block diagram of a content update device for Internet of Vehicles according to some embodiments of the present disclosure.

FIG. 9 schematically illustrates a block diagram of a content update device for an Internet of Vehicles according to some embodiments of the present disclosure. For example, the content update method for the Internet of Vehicles according to some embodiments of the present invention may be completed by the content update device 900 for the Internet of Vehicles similar to that shown in FIG. 9. As shown in FIG. 9, the content update device 900 according to some embodiments of the present disclosure comprises:

a clustering means 910, for dividing onboard units into clusters based on interest content information of the onboard units, wherein each of the clusters comprises at least one cluster-head onboard unit;

a first updating means 920, for periodically updating a content copy stored in the onboard unit in the cluster according to a first degree of interest; and a second updating means 930, for periodically updating a content copy stored in a second-level CDN server at the roadside unit in the Internet of Vehicles according to a second interest degree.

According to an aspect of the present disclosure, there is provided one or more non-transitory computer readable storage medium with a computer program stored thereon that, when executed, implements the content delivery method or content update method for Internet of Vehicles according to some embodiments of the present disclosure.

In the description of the present specification, the descriptions of the terms "one embodiment", "some embodiments", "example", "specific examples", or "some examples" and the like are intended to mean the specific features, structures, materials or characteristics described in connection with the embodiments or examples are comprised in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, various embodiments or examples described in the specification, as well as features of various embodiments or examples, may be combined without conflicting.

Moreover, the terms "first" and "second" are used for descriptive purposes only and are not to be construed as indicating or implying a relative importance or implicitly indicating the number of technical features. Thus, features defining with "first" or "second" may comprise at least one of the features, either explicitly or implicitly. In the description of the present disclosure, the meaning of "a plurality" is at least two, such as two, three, etc., unless specifically defined otherwise.

Any process or method description in the flowcharts or otherwise described herein can be understood to represent a module, segment or portion of code comprising one or more executable instructions for implementing the steps of a custom logic function or process. And the scope of the preferred embodiments of the present disclosure comprises additional implementations in which the functions may be performed in an order not shown or discussed, e.g., in a substantially simultaneous manner or in the reverse order, depending on the function involved, which will be understood by those skilled in the art.

The logic and/or steps represented in the flowchart or otherwise described herein, for example, may be considered as an ordered list of executable instructions for implementing logical functions, and may be embodied in any non-transitory computer readable medium to be used by, or in conjunction with, an instruction execution system, apparatus, or device (e.g., a computer-based system, a system comprising a processor, or other system that can fetch and execute instructions from, an instruction execution system, apparatus, or device). In this specification, a "non-transitory computer-readable medium" may comprise, for example, the following: a portable computer disk (magnetic device), a random access memory, read only memory, erasable programmable read only memory or flash memory, optical fiber devices, and compact disc read only memory.

It should be understood that various parts of the present disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, it can be implemented by any one or combination of the following techniques well known in the art: discrete logic circuits with logic gates for implementing logic functions on data signals, ASIC with appropriate combinational logic gates, programmable gate array, field programmable gate array, and the like.

One of ordinary skill in the art will appreciate that all or part of the steps of the above-described embodiments may be performed by hardware associated with program instructions, which may be stored in a computer readable storage medium, comprising, when executed, one or a combination of the steps of the method embodiments.

In addition, each functional unit in various embodiments of the present disclosure may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as separate products, may also be stored in a computer readable storage medium.

The above is only a part of the embodiments of the present disclosure, and it should be noted that those skilled in the art can also make some improvements and refinements without departing from the principles of the present disclosure, which should also be considered as the scope of protection of the present disclosure.

It will be understand by those skilled in the art that the singular forms "a", "one", and "the" may also comprise plural phase, unless specifically stated. It is to be understood that the phrase "comprise" means the features, integers, steps, operations, elements or components are presented, but not exclude the presentation or addition of one or more other features, integers, steps, operations, elements, components or group thereof. It will be understood that when an element is referred to as being "connected" or "coupled" to another element, it can be directly connected or coupled to the other element, or an intermediate element can be present. Further, "connected" or "coupled" as used herein may comprise either a wireless connection or a wireless coupling. The term "and/or" used herein comprises all or any of the elements and all combinations of one or more of the associated terms.

Those skilled in the art will understand that all terms (comprising technical and scientific terms) used herein have the same meaning as commonly understood by one of ordinary skill in the art. It should also be understood that terms such as those defined in a general dictionary should be understood to have meaning consistent with the meaning in the context of the prior art, and will not be explained ideally or excessively formally unless specifically defined as herein.

The above description is only preferred embodiments of the present application and descriptions of the principles of the technology. It should be understood by those skilled in the art that the scope of the invention referred to in the present application is not limited to the specific combination of the above technical features, and should also cover other technical solutions formed by any combination of the above technical features or their equivalent features without departing from the inventive concept, e.g., technical solutions that are formed by replacement of the above features with the technical features disclosed in the present application (but not limited to) having similar functions.

The invention claimed is:

1. A content delivery method for a vehicle network associated with an Internet of Vehicles, the vehicle network comprising a plurality of onboard units and at least one roadside unit, the method comprising:
    dividing the plurality of onboard units into clusters based on interest content information of the plurality of onboard units, wherein ones of the clusters comprises at least one cluster-head onboard unit;
    receiving, by a first cluster-head onboard unit of the at least one cluster-head onboard unit in a first cluster of the clusters, an interest content access request of a requestor onboard unit in the first cluster; and
    searching for interest content corresponding to the interest content access request in the Internet of Vehicles, and sending the interest content that was searched to the requestor onboard unit,
    wherein the dividing the plurality of onboard units into clusters based on interest content information of the plurality of onboard units comprises:
    sending, by a sender onboard unit in the Internet of Vehicles, an interest content information of the sender onboard unit to a receiver onboard unit adjacent to the sender onboard unit;
    comparing, by the receiver onboard unit, the interest content information of the sender onboard unit with an interest content information of the receiver onboard unit;
    when the interest content information of the receiver onboard unit and the interest content information of the sender onboard unit are consistent, dividing the receiver onboard unit and the sender onboard unit into a cluster;
    determining status information of each onboard unit in the cluster by the following equation:

$$\sigma_i = \frac{Pc_i Tc_i Sc_i SS_{v_i,r}}{IC_i(\alpha + (S_i - S_{avg})^2)},$$

wherein $\sigma_i$ represents status information of the onboard unit i,
    $Pc_i$ represents a calculation processing capability value of the onboard unit i,
    $Tc_i$ represents a data forwarding capability value of the onboard unit i,
    $Sc_i$ represents a size of remaining disk storage space of the onboard unit i,
    $SS_{v,r}$ represents a signal strength of the nearest roadside unit received by the onboard unit i,
    $S_i$ represents a vehicle speed of the onboard unit i,
    $S_{avg}$ represents an average vehicle speed of all onboard units in the cluster,
    $IC_i$ represents a similarity between the interest content information of the onboard unit i and the interest content information of other onboard units in the cluster,
    $\alpha$ is a constant for adjusting value; and
    determining a cluster-head onboard unit based on the status information of each onboard unit in the cluster.

2. The method according to claim 1, wherein vehicles in which the plurality of onboard units are located are traveling in a same direction and are consistent in vehicle speed.

3. The method according to claim 1, wherein $IC_i$, is determined according to the following Euclidean distance equation:

$$IC_i = D((C_{i1}, C_{i2}, \ldots C_{in}), E(C_{j1}, C_{j2}, \ldots C_{jn})),$$

wherein $(C_{i1}, C_{i2}, \ldots C_{in})$ represents a content vector of the interest content information of the onboard unit i, and $E(C_{j1}, C_{j2}, \ldots C_{jn})$ represents an expectation vector of the interest content information of other onboard units in the cluster.

4. The method according to claim 3, wherein the determining a cluster-head based on the status information of each onboard unit in the cluster further comprises:
    calculating a probability that each onboard unit in the cluster is selected as the cluster-head based on status information by the following equation:

$$P_i = \frac{\sigma_i^k}{\sum_i (\sigma_i^k)},$$

wherein $P_i$ represents a probability that the onboard unit i is selected as the cluster-head, and k is a constant for adjusting the probability value; and
    determining the cluster-head vehicle unit based on the probability that each onboard unit is selected as a cluster-head.

5. The method according to claim 1, wherein the searching for the interest content corresponding to the interest content access request in the Internet of Vehicles comprises:
    searching for interest content in the order of the cluster-head onboard unit, non-cluster-head onboard units, a second-level CDN of the roadside unit and a first-level CDN server provided by a content provider.

6. The method according to claim 5, wherein the searching for the interest content corresponding to the interest content access request in the Internet of Vehicles and sending the interest content that was searched to the requestor onboard unit comprises:
  determining whether the interest content corresponding to the interest content access request is stored in the cluster,
  responsive to the interest content being stored in the cluster, sending requested interest content to the requestor onboard unit,
  responsive to the interest content not being stored in the cluster, forwarding the interest content access request to a second-level CDN server on a corresponding roadside unit;
  determining whether the requested interest content is stored in the second-level CDN server if the interest content access request is forwarded to the second-level CDN server on the corresponding roadside unit,
  responsive to the requested interest content being stored in the second-level CDN server, sending the requested interest content to the requestor onboard unit,
  responsive to the requested interest content not being stored in the second-level CDN server, forwarding the interest content access request to the first-level CDN server; and
  sending, by the first-level CDN server, the requested interest content to the requestor onboard unit when the interest content access request is forwarded to the first-level CDN server.

7. A content update method for a vehicle network associated with an Internet of Vehicles, the vehicle network comprising a plurality of onboard units and at least one roadside unit, the method comprising:
  dividing the plurality of onboard units into clusters based on interest content information of the plurality of onboard units, wherein ones of the clusters comprises at least one cluster-head onboard unit;
  periodically updating a content copy stored in a first onboard unit of the at least one cluster-head onboard unit in a first cluster of the according to a first degree of interest; and
  periodically updating a content copy stored in the second-level CDN server of the roadside unit according to a second degree of interest
  wherein the dividing the plurality of onboard units into clusters based on interest content information of the plurality of onboard units comprises:
  sending, by a sender onboard unit in the Internet of Vehicles, an interest content information of the sender onboard unit to a receiver onboard unit adjacent to the sender onboard unit;
  comparing, by the receiver onboard unit, the interest content information of the sender onboard unit with an interest content information of the receiver onboard unit;
  when the interest content information of the receiver onboard unit and the interest content information of the sender onboard unit are consistent, dividing the receiver onboard unit and the sender onboard unit into a cluster;
  determining status information of each onboard unit in the cluster by the following equation:

$$\sigma_i = \frac{Pc_i Tc_i Sc_i SS_{v,r}}{IC_i(\alpha + (S_i - S_{avg})^2)},$$

wherein $\sigma_i$ represents status information of the onboard unit i,
$Pc_i$ represents a calculation processing capability value of the onboard unit i,
$Tc_i$ represents a data forwarding capability value of the onboard unit i,
$Sc_i$ represents a size of remaining disk storage space of the onboard unit i,
$SS_{v,r}$ represents a signal strength of the nearest roadside unit received by the onboard unit i,
$S_i$ represents a vehicle speed of the onboard unit i,
$S_{avg}$ represents an average vehicle speed of all onboard units in the cluster,
$IC_i$ represents a similarity between the interest content information of the onboard unit i and the interest content information of other onboard units in the cluster; and
determining a cluster-head onboard unit based on the status information of each onboard unit in the cluster.

8. The method according to claim 7,
wherein the $IC_i$ is determined according to the following Euclidean distance equation:

$$IC_i = D((C_{i1}, C_{i2}, \ldots C_{in}), E(C_{j1}, C_{j2}, \ldots C_{jn})),$$

wherein $(C_{i1}, C_{i2}, \ldots C_{in})$ represents a content vector of the interest content information of the onboard unit i, E $(C_{j1}, C_{j2}, \ldots C_{jn})$ represents an expectation vector of the interest content information of other onboard units in the cluster, and $\alpha$ is a constant for adjusting value,
wherein the determining a cluster-head based on the status information of each onboard unit in the cluster comprises:
calculating a probability that each onboard unit in the cluster is selected as the cluster-head based on the status information by the following equation:

$$P_i = \frac{\sigma_i^k}{\sum_i (\sigma_i^k)},$$

wherein $P_i$ represents a probability that the onboard unit i is selected as the cluster-head, and k is a constant for adjusting the probability value; and
determining the cluster-head vehicle unit based on the probability that each onboard unit is selected as a cluster-head.

9. The method according to claim 7, wherein the periodically updating a content copy stored in the onboard unit in the cluster according to a first degree of interest comprises:
calculating the first degree of interest of the content copy based on the following equation:

$$IM_x = \alpha_1 \frac{SS_{v_x r}}{\sigma + (S - S_{avg})^2} + \alpha_2 \frac{N_R^k N_T}{(\tau - T_{void})^k}$$

wherein $IM_x$ represents a first degree of interest of the content copy x, $SS_{v_x r}$ represents a signal strength of an adjacent roadside unit received by the onboard unit where the content copy x is located, S represents a vehicle speed of the onboard unit where the content copy x is located, $S_{avg}$ represents an average vehicle speed of all onboard units in the cluster, $N_T$ represents a total number of times a content copy x is accessed from a time when the content copy x was created to current time; $N_R$ represents a number of times the content copy x is accessed within a preset time period; $T_{void}$ represents a number of times that the content copy x is not accessed within the preset time period, $\alpha_1$, $\alpha_2$, $\sigma$, $\tau$, and k are value adjustment parameters and are positive constants and $\alpha_1 < \alpha_2$.

10. The method according to claim 7, wherein the periodically updating a content copy stored in the second-level CDN server of the roadside unit side in the Internet of Vehicles according to a second degree of interest comprises:
calculating the second degree of interest of the content copy based on the following equation:

$$IM'_x = \frac{N_R^k N_T}{(\tau - T_{void})^k},$$

wherein $IM'_x$ represents a second degree of interest of the content copy x, $N_T$ represents a total number of times the content copy x is accessed from a time when the content copy x was created to a current time; $N_R$ represents a number of times a content copy x is accessed within a preset time period; $T_{void}$ represents a number of times that the content copy x is not accessed within the preset time period, and $\tau$ is a positive constant for adjusting value.

11. The method according to claim 7, wherein the method further comprises:
determining a number of second-level CDN servers corresponding to the updated content copy based on an average vehicle speed of vehicles on the road where the roadside unit is located, a size of the updated content copy, and a spacing between the roadside units; and
sending a notification for establishing the updated content copy to the number of second-level CDN servers in the vicinity of the second-level CDN server where the updated content copy is located.

12. The method according to claim 11, wherein the determining the number of second-level CDN servers corresponding to the updated content copy based on the average vehicle speed of vehicles on the road where the roadside unit is located, the size of the updated content copy, and the spacing between the roadside units comprises:
determining the number of second-level CDN servers corresponding to the updated content copy according to the following equation:

$$N_y = \frac{Size S_{avg}}{BW_{min} W_{RSU}} + 1,$$

wherein $N_y$ represents a number of roadside units corresponding to an updated content copy y, Size represents a size of the updated content copy y, $S_{avg}$ represents an average speed of vehicles on a road where the roadside unit is located, $BW_{min}$ represents a minimum bandwidth of the Internet of Vehicles, and $W_{RSU}$ represents a spacing between the roadside units.

13. A non-transitory computer readable storage medium storing computer program instructions thereon which, when executed, perform operations of the content delivery method for an Internet of Vehicles according to claim 1.

14. A non-transitory computer readable storage medium storing computer program instructions thereon which, when executed, perform operations of the content update method for an Internet of Vehicles according to claim 7.

* * * * *